Feb. 3, 1959     J. McNAMARA     2,872,562
COOKING UTENSIL
Filed Sept. 17, 1956
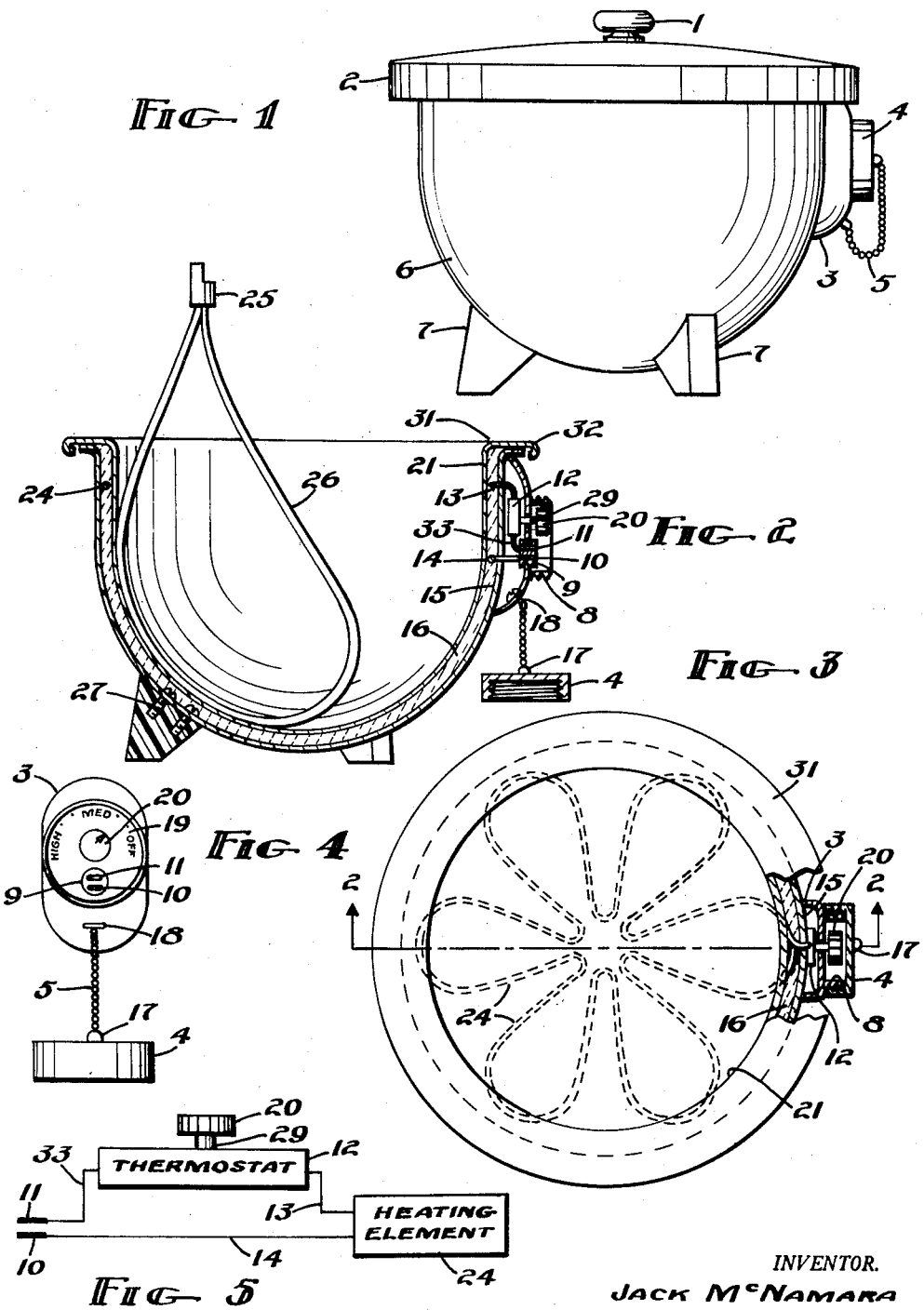
INVENTOR.
JACK McNAMARA
BY
ATTORNEY United States Patent Office 2,872,562
Patented Feb. 3, 1959

2,872,562

COOKING UTENSIL

Jack McNamara, Swisher, Iowa

Application September 17, 1956, Serial No. 610,349

1 Claim. (Cl. 219—44)

This invention relates in general to cooking utensils and in particular to an automatic mixing bowl which has a heating element that allows food to be cooked and kept warm.

It is time consuming and requires the washing of many dishes to cook food in one pan and then transfer it to a mixing bowl to be mixed. Also the food will cook while being mixed.

It is an object of this invention to provide a combination mixing bowl and cooking pot.

Yet another object is to provide a mixing bowl that allows food to be kept warm while being mixed.

A feature of this invention is found in the provision for a mixing bowl with a heating element that can be regulated to control the temperature and which has a waterproof cover which allows washing.

Further objects, features and advantages will become apparent from the following description and claim when read in view of the drawings, in which;

Figure 1 shows the combination pan of this invention;

Figure 2 is a sectional view of the pan;

Figure 3 is a top view of the pan;

Figure 4 is an enlarged detail view of the heat control and waterproof cover, and;

Figure 5 is a wiring diagram for the device.

Figure 1 shows a combination mixing and cooking bowl which has a lid 2 that has a lifting knob 1. The main body portion 6 has supporting legs 7 that are attached by screws 27. An extension 3 contains a heat control element and has a waterproof cover 4 that is attached to the bowl by a chain 5.

Figure 2 shows that the bowl that has an inside liner 21 that has a rim 31 about its top edge. A rolled edge 32 is formed about the rim 31. Between the outer cover 6 and inside liner 21 are mounted a number of heating elements 24 which are embedded in insulating material 16.

The extension 3 contains electrical leads 13 and 14 which are connected to the heating elements 24.

A plug 9 is mounted in the extension 3 and has contacts 10 and 11 for receiving a plug-in extension cord. Lead 14 is attached to contact 10 and lead 33 is attached to contact 11. The other end of lead 33 is connected to thermostat 12.

The thermostat 12 may be adjusted by knob 20 which is attached thereto by shaft 29.

A wall 15 is mounted adjacent the insulation 16 within the extension 3.

A threaded collar 8 is attached to extension 3 and receives the cover 4.

As shown in Figure 4 the chain 5 is attached to a bracket 17 that is attached to cover 4. The opposite end of the chain is attached to the extension 3 by holding means 18. A dial 19 has various temperature indications to which knob 20 may be set.

Figure 4 is a top cut-away view which shows the arrangement of the heating element 24.

Figure 5 is a wiring diagram that shows contacts 10 and 11. Thermostat 12 is connected to contact 10. Heating element 24 is connected by lead 14 to contact 11 and by lead 13 to thermostat 12.

In operation food may be placed in the bowl and cooked by setting knob 20 to the proper temperature. The lid 2 may be on the bowl if desired. Suppose that potatoes are cooked in the bowl. After cooking they may be whipped and kept warm in the bowl. The lid 2 may be removed and a whip 26 of a mixer which may be attached to the mixer by holder 25 can be inserted into the bowl to whip the potatoes. During this time the knob 20 can be turned to a lower temperature for warming purposes. After whipping the lid may be replaced and the potatoes left warm until used.

When the bowl is to be washed, the cover 4 is screwed over the collar 8 to provide a waterproof seal that protects the thermostat and electrical wiring.

It is seen that this invention provides an improved mixing bowl. Although this invention has been described with respect to a preferred embodiment it is not to be so limited as changes and modifications may be made therein which are within the full intended scope as defined by the appended claim.

I claim:

A combination cooking and mixing bowl comprising, a hemispherical shaped body portion, legs mounted on the body portion, an inner liner mounted within the body portion, heating elements mounted between the liner and the body portion, insulation material mounted between the body portion and the liner, an extension attached to the body portion, a threaded collar attached to the extension, a water-proof cap detachably connected to the collar, a thermostat within the extension, an electrical plug with one side connected to the thermostat and the other side connected to one side of the heating element, the other side of the heating element connected to the thermostat, and a temperature control knob connected to the thermostat and extending into the collar.

References Cited in the file of this patent

UNITED STATES PATENTS

| 2,274,930 | Newton | Mar. 3, 1942 |
| 2,571,782 | Swenson | Oct. 16, 1951 |
| 2,699,489 | Gorham | Jan. 11, 1955 |
| 2,744,995 | Jepson | May 8, 1956 |

FOREIGN PATENTS

| 497,920 | Germany | May 16, 1930 |